Nov. 3, 1931.  G. T. FELBECK  1,830,197
INTERNAL COMBUSTION ENGINE
Filed Nov. 12, 1926
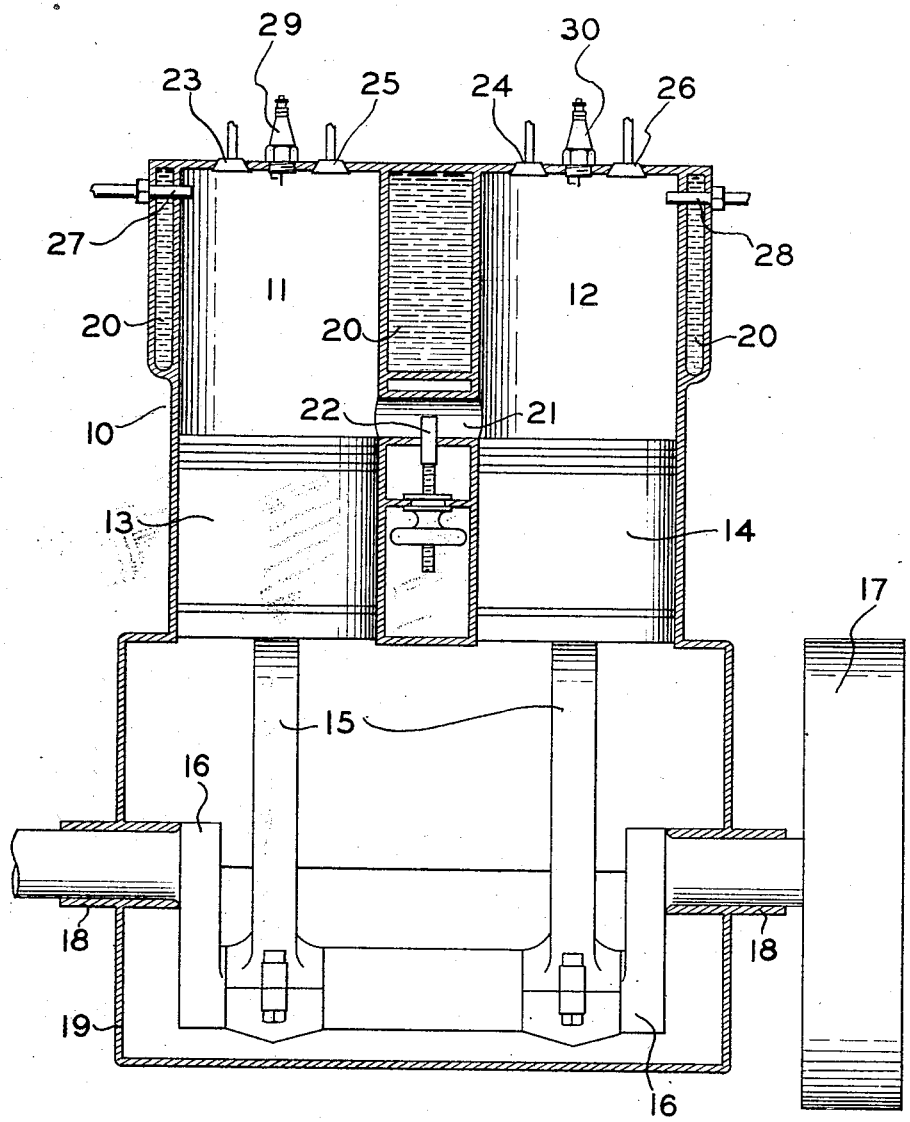
INVENTOR.
George T. Felbeck.

Patented Nov. 3, 1931

1,830,197

UNITED STATES PATENT OFFICE

GEORGE T. FELBECK, OF ROCKVILLE CENTER, NEW YORK

INTERNAL COMBUSTION ENGINE

Application filed November 12, 1926. Serial No. 147,956.

This invention relates to improvements in internal combustion engines and its purpose is to increase the efficiency of combustion, reduce the weight, and to permit the use of a variety of fuels, more or less volatile, in a given engine having a fixed compression ratio. The invention is applicable to types of engines in which the fuel is drawn into the cylinder through a carburetor with the intake air or is sprayed directly into the cylinder, ignition being effected by any of the common methods or spontaneously.

To insure efficient operation of an internal combustion engine of the type now commonly used in automobiles, the mixture of fuel and air formed in the carburetor must be a mixture of gasified fuel and air and not a mixture formed by small globules of liquid fuel held in suspension in the air. If the fuel is not completely gasified, incomplete and consequently inefficient combustion results because sufficient oxygen for complete combustion cannot come into contact with the relatively large particles of liquid fuel in the very short time available for the burning of the fuel. Unequal distribution of the fuel air mixture to the various cylinders of a multicylinder engine, crankcase dilution, the depositing of carbon on the cylinder head and piston etc. are other unfavorable results from incomplete vaporization of the fuel. The method now most commonly used in attempting to obtain a mixture of truly gasified fuel and air in an engine using a carburetor with an intake manifold for distributing the mixture to the various cylinders is to heat the intake manifold or a portion of it by means of the exhaust gas on its way from the exhaust valves of the various cylinders to the atmosphere. Such heating of the charge is necessary to completely volatilize the ordinary motor gasoline now available. Even with such preheating as can thus be obtained, the large amount of carbon monoxide in the exhaust gas from the ordinary automobile engine of today shows that combustion is very inefficient. A further disadvantage resulting from the preheating of the charge of fuel and air before it is drawn into the cylinder is that the density of the mixture of fuel and air is considerably decreased so that the weight of fuel and air drawn into a cylinder of given volume is therefore reduced and consequently the power of the engine is reduced. Obviously the amount of preheating that can be done in the intake manifold is limited to that amount which will not seriously lessen the power of the engine. Therefore fuels materially less volatile than the ordinary motor gasolines now available cannot be used.

If a fuel spray nozzle is used to inject the fuel into each cylinder during the compression stroke of the ordinary four stroke cycle engine of today, the engine must be carefully designed with a compression ratio that is suitable for the particular fuel that it is intended to use so that the compression pressure and consequently the compression temperature will be high enough to insure volatilization of the fuel but not high enough to produce pre-ignition of the charge. Obviously such perfect design is impossible, so that engines using fuel injection spray valves are ordinarily designed so that injection of the fuel does not occur until very shortly before the time for ignition of the fuel to occur, the compression pressure being as low as possible to insure regular ignition by a spark plug, a hot iron plug or an electric hot plug. The fuel does not have time to vaporize or gasify before the burning starts, so that again incomplete combustion results due to the fact that it is not possible for sufficient oxygen to come into contact with the relatively large globules of liquid in the short time that is available for the combustion of the fuel.

The principal object of the present invention is to provide an improved engine in which the fuel is completely vaporized within the cylinder and in which the compression temperature may be controlled by the operator, so that the mixture of vaporized fuel and air and other gases in the cylinder may be brought to any desired temperature near the end of the compression stroke, thus making it possible to burn in a given engine, relatively non-volatile fuels now available and to effect ignition electrically or with a hot plug or spontaneously as desired. The fuel within the cylinder is vaporized partly by the introduction of hot exhaust gases from another cylinder or chamber into the cylinder, and partly by the compression of the mixture of fuel, air and hot gases. By controlling the amount of hot exhaust gas allowed to enter the cylinder previous to compression, the initial temperature of the charge and the amount of heat added to the fuel can be controlled and consequently the compression temperature (which is dependent on the initial temperature) may be controlled.

Various other objects and advantages of the invention and its method of operation will appear more clearly from the following specification taken with the accompanying drawing in which the figure shows a vertical section of a two-cylinder engine embodying the features of the invention.

Although the invention may be employed in connection with engines embodying various numbers of cylinders and with two stroke cycles or four stroke cycles, the improvement is here illustrated by a two-cylinder four stroke cycle engine 10 having cylinders 11 and 12 located side by side with pistons 13 and 14 mounted to operate in the respective cylinders. The pistons are connected by connecting rods 15 with the crank shaft 16 which carries fly-wheel 17 and is mounted in bearings 18 formed in the walls of the crank case 19. The cylinders are provided with the usual water jackets 20 and are connected by a transverse passage 21 in which is placed control valve 22. Inlet valves 23 and 24 and exhaust valves 25 and 26 are mounted in the upper ends of cylinders 11 and 12 respectively, and are adapted to be operated by any suitable mechanism to cause their movements to be timed properly with the movements of the pistons 13 and 14. Nozzles 27 and 28 lead through the upper walls of cylinders 11 and 12 to permit the injection of fuel into the cylinders and these nozzles are controlled by suitable mechanism so that the injection of the fuel may be timed with the compression of the contents of the cylinders in a manner adapted to effect the proper vaporization of the fuel. For the case in which the fuel and air are mixed in a carburetor and drawn into the cylinders through inlet valves 23 and 24, the fuel injection nozzles are, of course, not used. For the purpose of effecting ignition of the charge of each cylinder at the proper time, spark plugs 29 and 30 are provided in the upper ends of the cylinders 11 and 12 respectively, and these spark plugs may be connected in the usual manner to any suitable magneto or other ignition device. If spontaneous ignition is to be used, these spark plugs will function only during the starting period.

In the operation of the engine, assuming the fuel injection method is used with electric ignition, the two pistons 13 and 14 move together and upon the first downward stroke of the piston 13 air is drawn into the cylinder 11 through the inlet valve 23. During the next up stroke or compression stroke, gasoline or other easily ignited fuel is injected into the cylinder 11 through the nozzle 27 in the form of a spray, and this fuel is ignited at the end of the compression stroke by a spark produced by plug 29. The combustion and subsequent expansion of the mixture in the cylinder produces a downward or power producing stroke, and as this stroke takes place, air is drawn into the parallel cylinder 12 through the other inlet valve 24. This valve 24 is closed at or soon after the instant that the pistons 13 and 14 pass the upper edge of the connecting passageway 21 and as the downward movement of the pistons continues, portions of the hot gases in the cylinder 11, which are then at a higher pressure than the air in the cylinder 12, will pass through valve 22 into the cylinder 12, and thus are available to effect the complete vaporization of the fuel of low volatility which is now sprayed into cylinder 12 through nozzle 28. When the second return stroke of the pistons takes place, the mixture of air, hot gases and fuel in the cylinder 12 is compressed by the piston 14 after the closing of the passage 21 by the initial movement of the pistons. During this stroke the remainder of the hot gases in cylinder 11 is discharged through the valve 24. Also during this stroke the fuel sprayed into cylinder 12 is being vaporized and the air heated due to the presence of the hot gases from cylinder 11, and the whole mixture of air, hot gases and fuel is being heated up by the compression resulting from the up stroke of piston 14. By the time the compression stroke is nearly completed, the liquid fuel that has been sprayed into the cylinder will have been completely vaporized and the temperature of the whole mass of gas raised to a point just below the ignition temperature of the fuel. Ignition is then effected by a spark from plug 30. The combustion of the contents of the cylinder 12 then takes place, producing another forward or downward stroke of the pistons, and causing a new charge of air to be drawn into the cylinder 11 through valve 23. Then when the transverse passage 21 is uncovered by the pistons, a portion of the hot gases in the cylinder 12 flows into the cylinder 11 to vaporize the fuel of low volatility that is then sprayed into cylinder 11 through nozzle 27. The next upward stroke of the pistons effects a compression of the mixture of air, hot gases and fuel in the cylinder 11 during which the fuel is completely vaporized, and the temperature of the contents of cylinder 11 is raised to a point just below the ignition temperature of the fuel after which ignition is effected by a spark from plug 29. This cycle of operations is repeated as the successive strokes of the pistons take place, the power strokes of the pistons taking place alternately. During the operation of the engine the amount of hot gases being transferred from one cylinder to the other through passage 21 and valve 22 may be adjusted to suit the requirements of the particular fuel being used and the load on the engine by slightly opening or closing valve 22, according as to whether the quantity of hot gas passing from one cylinder to the other is to be increased or decreased. The proper adjustment of valve 22 may be readily determined by observing the operation of the engine. If valve 22 is not open sufficiently to allow enough hot gas to pass through to effect complete vaporization of the fuel, incomplete combustion will occur, and the engine will become sluggish, while if valve 22 is open too far, thus permitting an excess of hot gas to pass from one cylinder to another, the fuel will be heated to such a temperature that automatic ignition will occur during the compression stroke, and violent knocking in the engine will result. To obtain automatic or spontaneous ignition at the proper instant for smoother running and maximum power, it is only necessary to adjust valve 22 until the opening for gas passage will just permit the correct amount of hot gas to pass from one cylinder to the other. Valve 22 may be arranged for mechanical operation for controlling the amount of hot gas traversing passage 21. A poppet type valve for instance may be used which is open only during the time gas is actually passing through the valve, the amount of gas being varied by varying the extent of opening of the valve or by varying the time and duration of the opening.

When idling or running at very low loads, the amount of air that is drawn into the cylinder of the type of engine using fuel spray valves should be reduced by throttling the inlet air by a valve in the inlet manifold, as is done in carburetting engines. The ratio of the weight of air to the weight of fuel in the cylinder is thus kept down to the proper value to maintain the necessary rate of combustion to insure complete and efficient burning of the fuel.

There are, of course, other arrangements of cylinders that may be used in place of the one described. For instance, in a four stroke cycle engine, a chamber may be attached to the side of the cylinder and connected thereto by a passage with a valve so that at the end of the explosion stroke the chamber is filled with hot gases which are returned at the end of the suction stroke to the cylinder whence they came. The same arrangement may be used with a two stroke cycle engine, the piston opening and closing the passage from the cylinder to the chamber before the exhaust passage or valve is opened.

In a two stroke cycle double opposed piston or Junkers type engine, the passage of hot gas from one cylinder to another may be accomplished by placing the cranks of the two cylinders at 180° from each other, and locating the transfer passage so that it is opened at the time 90° of the expansion stroke in one cylinder is completed, being, of course, the same time that 90° of the compression stroke in the other cylinder is completed.

Many advantages result from this invention due to the complete vaporization of the fuel, and due to the fact that the temperature at the end of the compression stroke may be controlled by the operator, even though the compression ratio is fixed and unchangeable in a given engine. In the ordinary hot bulb engine in which vaporization of a part of the fuel is attempted during a short period near the end of the compression stroke with ignition resulting from the high temperature of the hot bulb, relatively high compression pressures must be used, that is, of the order of 300 lb. per sq. in. or above, in order that the air which has been compressed shall be sufficiently hot so that the first portion of the fuel which is injected shall be vaporized, thus permitting ignition to be effected by the hot bulb. The remainder of the fuel which is injected slowly and continuously from the start, is burned inefficiently, since combustion is attempted while this fuel is still in the form of small globules of liquid. The fuel is not all injected during the early part of the compression stroke, since combustion of all of the fuel at the high compression pressure would result in a constant volume explosion developing exceedingly high explosive pressures. Since it is not possible to control the compression temperature, preignition and violent knocking occurs from too early injection of the fuel. In order to provide for the possibility of early injection and preignition, these engines must be built sufficiently strong to withstand excessive explosion pressures, and consequently are very heavy and massive and costly to manufacture. The engine described in this specification uses a compression ratio lower than that which will cause spontaneous ignition of the fuel by the heat of compression alone of the fuel and air mixture, for instance of the order of compression ratio now used in automobile and airplane engines. The charge of fuel may therefore be completely injected into the cylinder during the compression stroke without danger of preignition. By causing hot gases to enter the cylinder, as described above, sufficient heat is supplied to the charge within the cylinder in addition to the heat of compression, to vaporize the fuel and to raise the final compression temperature to the desired value for the given fuel which is just below or at its automatic ignition temperature. Thus with this engine low compression pressures may be used with resulting moderate explosion pressures. There is no danger of preignition beyond the control of the operator. The fuel is completely vaporized or gasified before combustion starts, and is also thoroughly mixed with the air due to the turbulence set up by the incoming hot gases, so that combustion is rapid, the fuel being burned completely, resulting in high engine efficiency. By causing spontaneous ignition to occur at the proper instant, more rapid combustion may be obtained than by electric or other ignition methods, since with spontaneous ignition, combustion starts at many points in the mass of gas at the same time, thus eliminating explosion waves.

In high compression engines of the semi-Diesel or full Diesel types, the use of this invention will permit the efficient burning of even heavier and lower grade fuels than is now possible in these types.

Further advantages accrue when the invention is used in connection with engines using carburetors. No preheating of the intake manifold is necessary, since the fuel may be carried into the cylinder with the air as a mist. The maximum weight of fuel-air mixture may therefore be drawn into the cylinder, since no increase in temperature with consequent reduction in density occurs in the inlet manifold. Also, since the fuel is completely vaporized in the cylinder, and since the cylinder walls are quickly heated up when starting, even in cold weather, no condensation of fuel occurs on the cylinder walls. Dilution of the lubricating oil is thus eliminated, and efficient operation obtained very quickly after starting.

From the foregoing it will be seen that the air which is heated after admission to the cylinder and by means of the hot gases of combustion, may be either air to which fuel has previously been admitted or air to which the fuel is later admitted, depending upon whether the engine is of the carburetor or Diesel type.

By means of the improvements described here, an engine may be built of low weight and low cost, in which practically any fuel may be burned efficiently, without danger of preignition, and without excessive pressures thus resulting in many advantages over the present liquid fuel engines.

What I claim is:

1. In an internal combustion engine, a cylinder, a piston therein, means for accomplishing spontaneous ignition comprising means for admitting hot gases under superatmospheric pressure to the cylinder and means for timing the ignition comprising means for varying the amount of hot gases admitted to the cylinder.

2. An internal combustion engine having a plurality of cylinders, pistons therein, means for admitting air to one of the cylinders during one stroke of its piston, means for heating the air so admitted and thereby increasing the pressure thereof by transferring hot gases of combustion to said cylinder directly from another of the cylinders, and means for controlling the pressure and temperature of the charge to be compressed during the next stroke of the piston by regulating the quantity of the hot combustion gases so transferred.

3. The method of operating an internal combustion engine which comprises drawing air into the cylinder by the suction created during recession of its piston, heating the air so admitted by injecting hot gases into said air after the admission of the latter to the cylinder, thereby increasing the temperature and pressure of the charge, compressing the mixture thus formed, burning a fuel therewith, and varying the compression temperature in the cylinder at the time of ignition by regulating the quantity of hot gases admitted to the cylinder.

4. The method of operating an internal combustion engine which comprises delivering air to the cylinder, increasing the temperature of the said air by injecting hot gases under super atmospheric pressure into the cylinder after the admission of the air, said hot gases being admitted in such quantity and at such temperature as to volatilize the fuel without preigniting the same, and varying the compression pressure in the cylinder at the time of ignition by regulating the quantity of hot gases so admitted to the cylinder.

In testimony whereof, I affix my signature.

GEORGE T. FELBECK.